UNITED STATES PATENT OFFICE.

JOHN CONDON HASSELL, OF NEVADA CITY, CALIFORNIA.

IMPROVEMENT IN MEDICAL COMPOUNDS FOR THE TEETH.

Specification forming part of Letters Patent No. 128,620, dated July 2, 1872.

*To all whom it may concern:*

Be it known that I, JOHN CONDON HASSELL, of Nevada City, State of California, have invented an Improved Medical Compound or Toothache Medicine; and I do hereby declare that the following description contains a full and exact description of the same, giving the names of the ingredients, and the proportion of each used, and the manner of mixing the same, together with directions for its use.

My invention or discovery relates to a medicine or compound for curing the toothache, and all diseases to which the teeth are subject.

To make my toothache cure or compound, I take one and one-half pounds of bark from the tree known as "black jack," a species of live oak, which grows in various parts of the United States, and boil it in one gallon of water until it has been reduced to one quart. I then take a quantity of whisky or other spirit and to each ounce and a half I add one table-spoonful of common salt, (chloride of rodium.) These two mixtures I then combine in the desired proportions, according to the strength of the compound or medicine which it is desired to employ.

This compound is to be taken in the mouth of the patient, and allowed to remain for a short time in contact with the teeth. No harmful results will follow if a portion be swallowed, as is apt to be the case in using such medicines.

By washing the teeth, and occasionally allowing them to come in contact with this medicine, decay of the teeth will be arrested, aching will be stopped, and loose teeth will be again firmly set. The medicine also arrests and cures disease of the gums, and neuralgia of the face induced by diseased teeth. In fact, it is a certain cure for the teeth in all cases, as has been fully demonstrated in numerous instances, in none of which has it failed.

Having thus described my invention, what I claim, and desire to secure by Letters Patent, is—

The medicine or compound for diseases of the teeth and gums, compounded of the ingredients specified in the manner described.

In witness whereof I hereunto set my hand and seal.

JOHN CONDON HASSELL. [L. S.]

Witnesses:
   H. LEVY,
   CHAS. N. SCHWAB.